United States Patent [19]
Hamlin et al.

[11] 3,795,445
[45] Mar. 5, 1974

[54] SLOPE CONTROL EXPOSURE CONTROL APPARATUS

[75] Inventors: Ronald Jackson Hamlin, Brockport; Richard Edmund Albrecht, Rochester, both of N.Y.

[73] Assignee: Eastman Kodak Company, Rochester, N.Y.

[22] Filed: Mar. 15, 1973

[21] Appl. No.: 341,434

[52] U.S. Cl. .................... 355/68, 250/227, 355/69
[51] Int. Cl. ......................................... G03b 27/78
[58] Field of Search .. 95/10 R; 355/68, 69; 250/227

[56] References Cited
UNITED STATES PATENTS

| | | | |
|---|---|---|---|
| 2,501,365 | 3/1950 | Varden | 355/68 |
| 2,995,978 | 8/1961 | Glanden et al. | 355/68 |
| 3,102,450 | 9/1963 | Grossmann | 355/68 |
| 3,220,330 | 11/1965 | Roos | 355/68 |
| 3,298,296 | 1/1967 | Mey | 355/68 |
| 3,521,952 | 7/1970 | Nelson et al. | 355/68 X |
| 3,639,058 | 2/1972 | Kimura | 355/68 X |
| 3,679,306 | 7/1972 | DuBois et al. | 355/68 |
| 3,698,809 | 10/1972 | Harter et al. | 355/68 |

*Primary Examiner*—Samuel S. Matthews
*Assistant Examiner*—Richard A. Wintercorn

[57] ABSTRACT

For use in a document reproducing apparatus such as a planetary microfilmer, a non-linear exposure control apparatus utilizing slope control includes at least one illumination lamp for projecting light upon a document to be photographed to expose a medium such as film to actinic light reflected from such document. The exposure control apparatus further includes a photocell adapted to produce an output signal which is a function of the intensity and spectrum of received actinic light. A filter is disposed in optical alignment with the photocell and adapted to pass to the photocell light coming directly from the lamp and light reflected from the document. The filter has a spectral response selected to cause the output signal of the photocell to correlate with the spectral response of the medium. A control circuit includes the photocell which terminates exposure after a predetermined exposure of the medium in response to the output signal. A feature of the invention is the simplicity of such control circuit.

5 Claims; 1 Drawing Figure

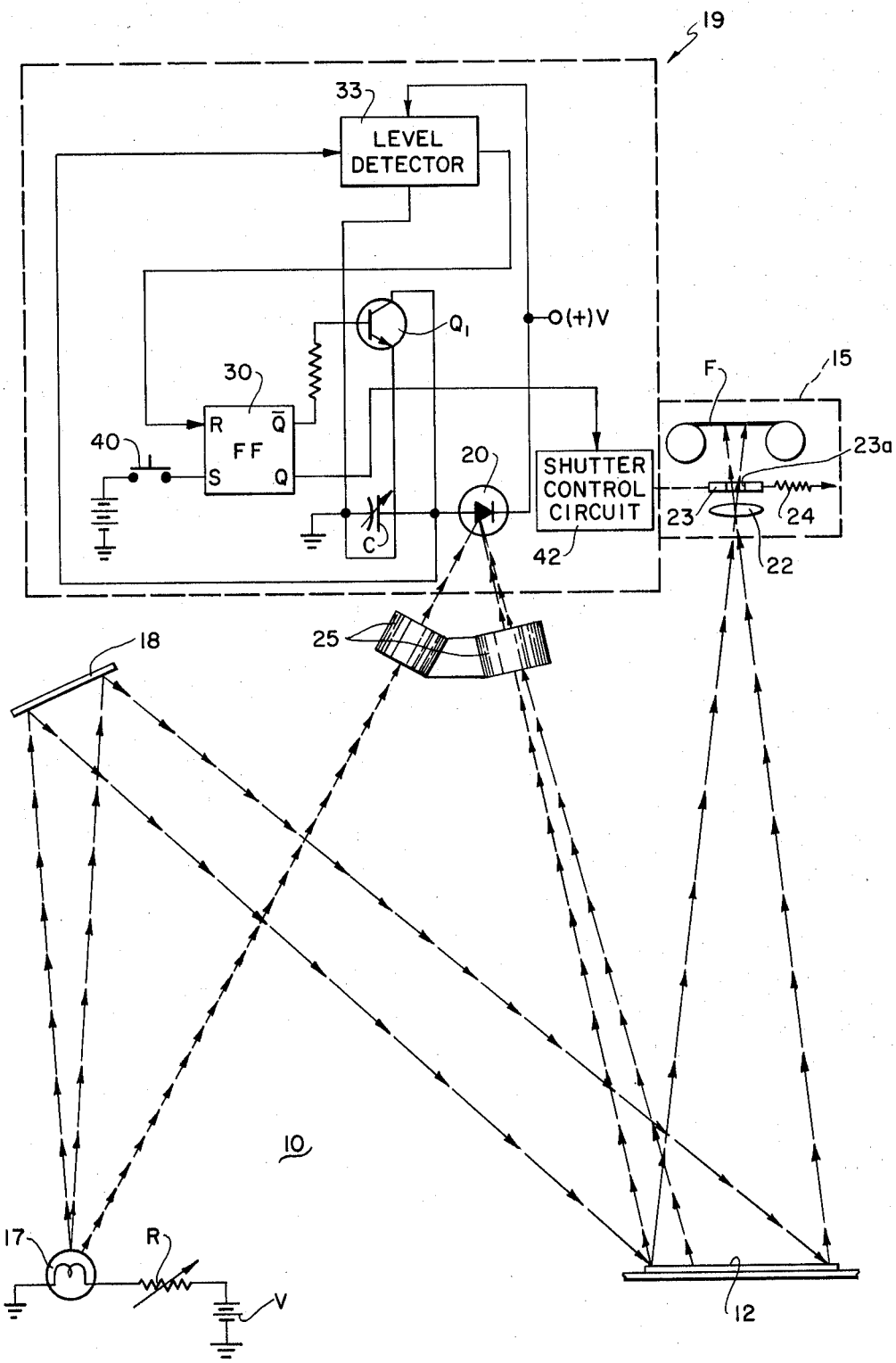

SLOPE CONTROL EXPOSURE CONTROL APPARATUS

BACKGROUND OF THE INVENTION

1. Field Of The Invention

The present invention relates to slope control/exposure control apparatus for use in document reproducing apparatus such as planetary microfilmers.

2. Description Of The Prior Art

It is a common practice for exposure control apparatus to vary the exposure time as a function of the reflectivity of the document to be reproduced. By using this technique, the resulting density of developed film for documents having either the same or different reflectivities will remain generally relatively constant. However, in mirofilming apparatus, the density of the developed film image is often varied as a function of the document reflectivity not maintained constant. This nonlinear type of exposure control is referred to as slope control. Conventionally a slope control type exposure control apparatus employs at least one photocell which is directly illuminated by the exposure lamps and which in addition receives reflected light from the document to be photographed. The output parameter of the photocell is then used to control exposure time and/or the intensity of the illumination lamps. An example of such an apparatus is disclosed in U.S. Pat. No. 3,439,117 to Rogers. This patent discloses a slope control/exposure control apparatus which utilizes two photocells; one having a parameter the magnitude of which varies as a function of document reflectivity and the other having a parameter, the magnitude of which varies as a function of the instantaneous level of intensity of the exposure lamps; and means coupled to both photocells and responsive to the magnitude of their respective parameters for varying intensities of illumination of exposure lamps to vary film exposure to effect a desired film density after the film has been developed. In other approaches a diaphragm defining an adjustable aperture is dispoed in cooperating relation with respect to the exposure lamp and the photocell to permit light from illuminating means to directly pass through the aperture and illuminate the photocell. Regulation of the size of the aperture adjusts slope control. Although such slope control techniques have performed satisfactory in the past, they often have dfficulty in producing a film record which has a desired density after it has been developed (exposed). A reason for this is that often prior apparatus have not taken into consideration the fact that the output of the photocell is not correlated with spectral characteristics of the film or medium which is being exposed. As a result, the control circuitry is often complex.

SUMMARY OF THE INVENTION

It is an object of the invention to provide an improved exposure control apparatus for use in photographic reproduction apparatus which simplifies the control circuitry.

It is a further object of the invention to provide a slope control/exposure control apparatus which adjusts the output of the photocell to correlate to the spectral response of the medium to be exposed.

A further object of the invention is to provide a slope control exposure control/apparatus which minimizes the effect of variations in operating characteristics of electrical components and power supplies sources.

A still further object of the invention is to provide a slope control/exposure control apparatus which utilizes a single photocell.

In accordance with the disclosed embodiment of the invention, a slope control type exposure control apparatus includes an exposure lamp for projecting light upon a document to be photographed to expose a medium such as film to actinic light reflected from such document, and a photocell disposed to receive light reflected from the portion of a document and light directly from the exposure lamp and produce an output signal. The exposure control apparatus further includes a filter disposed in optical alignment with the exposure lamp and adapted to pass light, directly from the illumination lamp and light reflected off the document to the photocell. The spectral response of the filter is selected to correlate with the spectral response of the medium. Control circuit means in response to the output signal cause the end of film exposure after a predetermined exposure.

A feature of the invention is that the output intensity of the lamp can vary substantially without greatly effecting the predetermined film exposure.

The invention and its objects and advantages will become more apparent in the detailed description of the preferred embodiment presented below.

BRIEF DESCRIPTION OF THE DRAWINGS

The above and other objects and advantages of the present invention will become apparent from the following detailed description taken in conjunction with the attached drawing, the sole FIGURE of which is a diagrammatic representation of an exposure control apparatus including a circuit diagram partially schematically and partially in block form.

DESCRIPTION OF THE PREFERRED EMBODIMENT

Slope control/exposure control apparatus embodying the invention may be employed in planetary microfilmer apparatus such as disclosed in commonly assigned Kodak U.S. Pat. No. D211,419, entitled, PHOTOGRAPHIC COPYING DEVICE issued June 11, 1968 in the name of Kenneth W. Scott.

Since such microfilm apparatus are well known, the present description will be directed in particular to elements forming part of or cooperating more directly with appratus according to the present invention. It will be understood that parts not specifically shown or described are selectable from those known in the art.

Turning now to the drawing, there is shown portions of a preferred embodiment of a planetary microfilmer 10 which includes a platen or copy board 12, a photographic station 15, a bank of exposure lamps shown for the sake of convenience as a single exposure lamp 17, a reflector panel 18 (which may be a mirror) and a control circuit 19.

The photographic station 15 is located in a spaced relation with respect to the reflective panel 18 and the exposure lamp 17 to receive light reflected from the document. As shown, light from the illuminated document is collected by a lens 22 which actually projects such light through an aperture 23a of a movable shutter 23 onto a film medium F which may be conventional 16mm microfilm.

For the sake of convenience, the exposure lamp 17 is shown connected in series with a battery V and an adjustable resistor R. By varying the resistance parameter of the resistor R, the intensity of illumination of the lamp 17 may be adjusted.

Turning momentarily to the control circuit 19, it is shown to include a photocell 20 which may be a photodiode adapted to produce an output signal which is a function of the intensity and spectrum of the received light. The photocell 20 is operated in a current generator mode (viz., produces current as a function of the level of intensity of incident illumination and the spectrum of such illumination).

In optical alignment with the photocell 20 is a filter 25, which is adapted to alter the spectrum of light transmitted to cause the output signal of the photocell to correlate with the spectral response of the film medium. The composition of the filter will, of course, depend upon the operating characteristics of both the photocell and the film medium. It has been found that for many photocells, a composite filter formed of glass and gelatin performs satisfactorily. The photocell 20 receives light along two paths. In the first path, light reflected from the document passes through the filter and illuminates the photocell 20. In the second path light directly from the lamp 17 passes through the filter and illuminates the photocell. In actual practice, as will be well understood to those skilled in the slope control/exposure control art, there may be provided an adjustable aperture in optical alignment with the second path. By varying the size of such aperture, slope control may be adjusted. Alternatively, a small movable mirror may be disposed adjacent a lens positioned in the first path. By varying the position of the mirror, the intensity of light received by the lens directly from the lamp may be adjusted. As another alternative, a light diffuser could be disposed to combine light from both paths. Those skilled in the art will understand that slope control may be varied by changing the ratio of directed light to document reflected light.

As previously noted, the photocell 20 is embodied in the control circuit 19 which includes an NPN transistor Q1 connected in parallel across an adjustable capacitor C. The capacitor is shown connected in series with the photocell 20 and a source of positive potential. The base electrode of the transistor Q1 is coupled to the 0 output side of a conventional R-S flip-flop 30. The electrical junction of the photocell 20 and the capacitor C is connected to a voltage level sensing circuit 33 which is adapted to provide a reset pulse back to the flip-flop 30 when the capacitor reaches the predetermined charge level. It should be noted that in accordance with the teachings of this invention the control circuit has been simplified. As a specific example, the photocell may be Catalog No. SD-4322-2 manufactured by Spectronics, Inc. and the filter may be a composite filter composed of glass (Corning Glass No. 9780) and a gelatine conversion filter selected to match the spectral response of the film which may be film types 3453 or 3460 manufactured by the Eastman Kodak Company. The voltage level sensing circuit 33 may be Type MCC-102 manufactured by Micro Components Corp.

The operation of the circuit 19 is as follows. To initiate exposure, a button 40 is depressed which momentarily provides a source of positive potential at the input of the set side of the flio-flop 30. This action causes the flip-flop 30 to change state (which is normally a high level state in the O state) and provides a positive level signal to a shutter drive circuit 42. The circuit 42 may include a solenoid which is shown by the dotted lines as connected to the shutter 23 and which, when energized, moves the shutter 23 against the force exerted by a spring 24 to a positon wherein the aperture 23a is disposed in optical alignment with the lens 22 and exposure may be commenced. At the same time, positive potential is removed from the base electrode of the transistor Q1 causing the transistor Q1 to change from a saturated to an unsaturated state. In such a situation, the capacitor C begins to charge. The rate of charge of the capacitor C is directly dependent upon the current produced by the photocell 20 which in turn is the function of the level of intensity of received incident illumination and the spectrum of such illumination. As previously noted, light was delivered to the photocell from two paths. In the first light path, light is projected directly from the lamp 17 and passes through the filter 25 and along the second path, light is reflected from the portion of the document as shown in the drawings and then passes through the filter 25. When the capacitor C develops a predetermined voltage, the voltage sensing circuit 33 provides a reset pulse back to the F/F 30 which causes it to change state. The F/F 30 de-energizes its signal to the shutter drive circuit solenoid causing it to de-energize. Thereafter, the shutter 23, under the urging of the spring 24, moves to its position wherein reflected light from the document is blocked from illuminating the medium F and the film exposure ceases. Transistor Q1 is again biased on to discharge capacitor C. The exposure of film may be varied by adjusting the capacitance of the capacitor C or by adjusting the threshold level of the voltage sensing circuit.

The invention has been described in detail with particular reference to a preferred embodient thereof, but it will be understod that variations and modifications can be effected within the spirit and scope of the invention.

We claim:

1. In document reproducing apparatus including illumination means for projecting light upon a document to expose a medium having a predetermined spectral response to actinic light reflected from such document, actuable means effective when actuated to terminate medium exposure, and non-linear exposure control means including photosensitive means disposed to receive light from the illumination means along, (1) a first path directly from the illumination means, and (2) a second path in which reflected light is received from a portion of such document, said photosensitive means having a parameter the magnitude of which varies as a function of the intensity and spectrum of light received along said first and second paths, the improvement comprising:

a. filter means disposed in said first and second paths in optical alignment with said photosensitive means for passing light along said first and second paths to said photosensitive means, said filter means having a predetermined spectral response which modifies the spectrum of the passing light to cause the parameter of said photosensitive means to correlate with the spectral response of such medium;

b. a control circuit having charging means coupled to said photosensitive means and responsive to the parameter for producing a charge level which is a function of the magnitude of the parameter; and c. means responsive to a predetermined charge level of said charging means for actuating said actuable means to terminate medium exposure.

2. The invention as set forth in claim 1 wherein said charging means includes a capacitor, and means for adjusting the charge rate of said capacitor.

3. The invention as set forth in claim 2 wherein said control circuit includes a single flip-flop.

4. The invention as set forth in claim 2 wherein the actuable means includes shutter means mounted for movement between a first position in which reflected actinic light from the document passes to the medium and a second position in which reflected document light is blocked from exposing the medium.

5. The invention as set forth in claim 3 wherein said photosensitive means is a photocell and the photocell parameter is current.

* * * * *